US009626140B2

(12) United States Patent
Nishikawa

(10) Patent No.: US 9,626,140 B2
(45) Date of Patent: Apr. 18, 2017

(54) PRINTING APPARATUS, METHOD OF MANAGING PRINT JOB OF PRINTING APPARATUS, AND STORAGE MEDIUM STORING PROGRAM

(71) Applicant: BROTHER KOGYO KABUSHIKI KAISHA, Nagoya-shi, Aichi-ken (JP)

(72) Inventor: Naoki Nishikawa, Toyoake (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/994,445

(22) Filed: Jan. 13, 2016

(65) Prior Publication Data

US 2016/0210094 A1    Jul. 21, 2016

(30) Foreign Application Priority Data

Jan. 26, 2015  (JP) .................................. 2015-012206

(51) Int. Cl.
G06F 15/00      (2006.01)
G06F 3/12       (2006.01)
H04N 1/00       (2006.01)
H04N 1/44       (2006.01)

(52) U.S. Cl.
CPC .......... *G06F 3/1267* (2013.01); *G06F 3/1222* (2013.01); *G06F 3/1274* (2013.01); *G06F 3/1285* (2013.01); *H04N 1/00411* (2013.01); *H04N 1/00891* (2013.01); *H04N 1/4413* (2013.01); *H04N 2201/0094* (2013.01)

(58) Field of Classification Search
USPC ................................................ 358/1.13–1.15
See application file for complete search history.

(56) References Cited

U.S. PATENT DOCUMENTS

2006/0082816 A1* 4/2006 Daniel ............... H04N 1/00204
                                              358/1.15

FOREIGN PATENT DOCUMENTS

JP        2006-289620 A    10/2006
JP        2008-250561 A    10/2008

* cited by examiner

*Primary Examiner* — Saeid Ebrahimi Dehkord
(74) *Attorney, Agent, or Firm* — Scully, Scott, Murphy & Presser, P.C.

(57) ABSTRACT

A processor of a printing apparatus performs: storing, in a memory, a print job received through a communicator; controlling a printer to print a hold job that is a print job stored in the memory, in response to receiving a print instruction for the hold job; setting a storage time, the storage time being one of a time period during which the hold job is stored and a time point until which the hold job is stored; when the hold job remains stored in the memory past the storage time, deleting the hold job from the memory; and in response to receiving a particular operation, performing at least one of: extending the storage time of the hold job by a particular period; and deferring deletion of the hold job until a completion condition is satisfied, the completion condition indicating that an operation to the input device is completed.

13 Claims, 10 Drawing Sheets

PRINTING APPARATUS, METHOD OF MANAGING PRINT JOB OF PRINTING APPARATUS, AND STORAGE MEDIUM STORING PROGRAM

CROSS REFERENCE TO RELATED APPLICATIONS

This application claims priority from Japanese Patent Application No. 2015-012206 filed Jan. 26, 2015. The entire content of the priority application is incorporated herein by reference.

TECHNICAL FIELD

This disclosure relates to a printing apparatus, a method of managing print jobs of a printing apparatus, and a storage medium storing a program.

BACKGROUND

Conventionally, technology of "hold printing" (store and print) is known that a print job received from an external apparatus is not printed right away and, in response to receiving a print instruction for the print job, printing of the print job is started.

In a printing apparatus capable of performing hold printing, there is a problem that a hold job (a print job for which hold printing is performed) is kept for a long period without being executed, which deteriorates confidentiality of the hold job. Proposed solutions to this problem include deleting a hold job that is stored past a particular storage time, and also extending a storage time when the storage time of the hold job included an unprintable period.

SUMMARY

However, the above-described conventional technology has the following problems. That is, by deleting a hold job automatically, confidentiality of the hold job can be improved. However, even in a situation that printing of the hold job is likely to be instructed, such as when a user is operating an operation panel, the hold job is deleted when the storage time elapses. Hence, even though the user intends to print a hold job, the hold job may be deleted or the user is urged to perform operation quickly, which may be inconvenient for the user.

In view of the foregoing, an example of the object of this disclosure is to provide technology of both securing confidentiality of a hold job and improving usability of user, in a printing apparatus configured to perform "hold printing".

According to one aspect, this specification discloses a printing apparatus. The printing apparatus includes a communicator configured to communicate with an external apparatus, an input device configured to receive an input operation, a printer, a processor, and a memory storing instructions. When executed by the processor, the instructions cause the processor to perform: a storing process of storing, in the memory, a print job received through the communicator; a hold printing process of controlling the printer to print a hold job that is a print job stored in the memory, in response to receiving, through the input device, a print instruction for the hold job; a setting process of setting a storage time, the storage time being one of a time period during which the hold job is stored and a time point until which the hold job is stored; a deletion process of, when the hold job remains stored in the memory past the storage time, deleting the hold job from the memory; and a deletion delaying process of, in response to receiving a particular operation through the input device, performing at least one of: an extending process of extending the storage time of the hold job by a particular period; and a deferring process of deferring deletion of the hold job by the deletion process until a completion condition is satisfied, the completion condition being a condition indicating that an operation to the input device is completed.

According to another aspect, this specification also discloses a method of managing a print job of a printing apparatus. The method includes: storing, in a memory, a print job received by the printing apparatus; printing a hold job that is a print job stored in the memory, in response to receiving a print instruction for the hold job; setting a storage time, the storage time being one of a time period during which the hold job is stored and a time point until which the hold job is stored; when the hold job remains stored in the memory past the storage time, deleting the hold job from the memory; and in response to receiving a particular operation through an input device of the printing apparatus, performing at least one of: extending the storage time of the hold job by a particular period; and deferring deletion of the hold job until a completion condition is satisfied, the completion condition being a condition indicating that an operation to the input device is completed.

According to still another aspect, this specification also discloses a non-transitory computer-readable storage medium storing a program executable by a processor of a printing apparatus. When executed, the program causes the processor to perform: a storing process of storing, in a memory, a print job received by the printing apparatus; a hold printing process of controlling the printer to print a hold job that is a print job stored in the memory, in response to receiving a print instruction for the hold job; a setting process of setting a storage time, the storage time being one of a time period during which the hold job is stored and a time point until which the hold job is stored; a deletion process of, when the hold job remains stored in the memory past the storage time, deleting the hold job from the memory; and a deletion delaying process of, in response to receiving a particular operation through an input device of the printing apparatus, performing at least one of: an extending process of extending the storage time of the hold job by a particular period; and a deferring process of deferring deletion of the hold job by the deletion process until a completion condition is satisfied, the completion condition being a condition indicating that an operation to the input device is completed.

BRIEF DESCRIPTION OF THE DRAWINGS

Embodiments in accordance with this disclosure will be described in detail with reference to the following figures wherein.

DETAILED DESCRIPTION

Hereinafter, a printing apparatus according to the present embodiment will be described in detail while referring to the accompanying drawings. In the present embodiment, this disclosure is applied to an MFP (Multifunction Peripheral) configured to execute (print) a hold job.

[Electrical Configuration of MFP]

Figure 1:
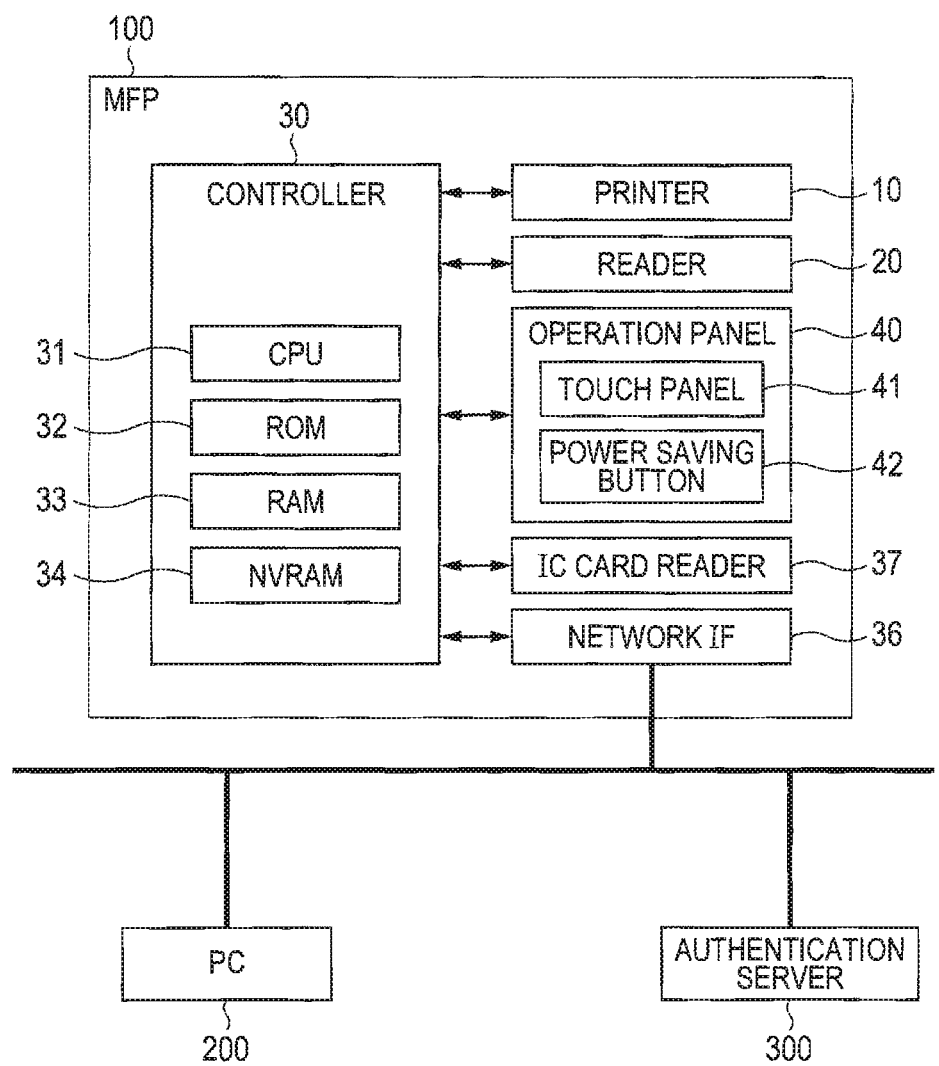
FIG. 1 is a block diagram showing the electrical configuration of a multifunction peripheral (MFP) according to an embodiment.

As shown in FIG. 1, an MFP 100 of the embodiment has a controller 30 including a CPU 31, a ROM 32, a RAM 33, and an NVRAM (Non Volatile RAM) 34. The MFP 100 is an example of a printing apparatus. The controller 30 in FIG. 1 is a collective term including hardware used for controlling the MFP 100 such as the CPU 31, and does not necessarily mean a single hardware element existing in the MFP 100.

The ROM 32 stores firmware that is a control program for controlling the MFP 100, various settings, initial values, and so on. The RAM 33 and the NVRAM 34 are used as work areas from which various control programs are read out, or as storage areas for temporarily storing data. The RAM 33 and the NVRAM 34 are examples of a memory.

The CPU 31 controls each element of the MFP 100 while storing its processing results in the RAM 33 or the NVRAM 34 in accordance with the control programs read out from the ROM 32 and signals sent from various sensors. The CPU 31 is an example of a processor. Note that the controller 30 may be an example of the processor.

The MFP 100 includes a printer 10, a reader 20, an operation panel 40, an IC card reader 37, and a network interface 36, which are controlled by the CPU 31. Note that elements connected to the controller 30 is not limited to the elements shown in FIG. 1 and that elements other than the above-described elements are also connected to the controller 30 and controlled by the CPU 31.

The printer 10 prints an image based on image data on a sheet. The printer 10 has a print function, and may be an inkjet type or an electro-photographic type. Further, the printer 10 may be configured to perform color printing or may be dedicated to monochromatic printing.

The reader 20 reads an image of an original document and outputs image data. The reader 20 has a reader (scanner) function and may be a CIS type or a CCD type. Further, the reader 20 may be configured to read a color image or may be dedicated to monochromatic reading.

The operation panel 40 includes a touch panel 41 and a group of buttons having a start key, a stop key, ten keys, a power saving button 42, and so on. The touch panel 41 has both of a display function of displaying various messages and data and an input function of receiving an input operation by a user. The touch panel 41 is an example of an input device and a display.

The power saving button 42 is provided on the operation panel 40. The MFP 100 has: a power-saving mode of restricting power supply to the printer 10, the reader 20, and the touch panel 41; and a non-power-saving mode of not restricting power supply to these elements. When the power saving button 42 is pressed while operating in the non-power-saving mode, the MFP 100 shifts to the power-saving mode. Further, when the power saving button 42 is pressed while operating in the power-saving mode, the MFP 100 shifts to the non-power-saving mode.

The IC card reader 37 is hardware for reading information stored in an IC card by wireless communication. The MFP 100 has a reading base (not shown) for IC card at the front side of the main body, and has the IC card reader 37 at the underside of the reading base so that, when a user holds an IC card near the reading base, the IC card reader 37 reads information stored in the IC card. The IC card reader 37 is an example of the input device.

The network interface 36 is hardware for performing communication with an external apparatus connected to a network by wired or wireless communication. The MFP 100 is capable of performing communication with a personal computer (PC) 200 and an authentication server 300 through the network, for example. The MFP 100 receives a print job transmitted from the PC 200 through the network interface 36. Further, the MFP 100 may receive a print job transmitted from a mobile device by wireless communication. The network interface 36 is an example of a communicator.

[Printing Procedure of Hold Job]

Next, the procedure in which the MFP 100 prints a hold job will be described. In response to receiving a hold job (a job to be stored) from the external apparatus, the MFP 100 stores the hold job in the RAM 33. The received hold job includes user information that is information identifying the user who owns the hold job, such as a user ID and an IP address, and the hold job is stored in association with the user information.

The MFP 100 requires login for permitting use of the MFP 100 itself. The login is a part of operations for performing a print instruction of a hold job. When the MFP 100 receives authentication information for authenticating a user and succeeds in user authentication based on the authentication information, the login succeeds. This enables reception of a print instruction for a hold job associated with a login user. The login user is a user who has succeeded in login.

Figure 2A:
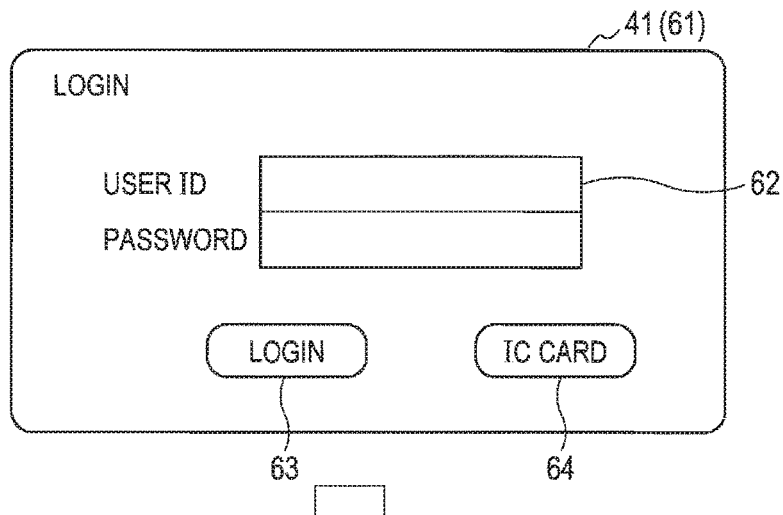
FIGS. 2A to 2C are diagrams showing screen transition of a touch panel when the MFP of the embodiment is used.

Specifically, the MFP 100 displays a login screen 61 shown in FIG. 2A on the touch panel 41. The login screen 61 includes an input section 62 for inputting authentication information, a login button 63 for inputting a login instruction, and an IC card button 64 for temporarily enabling reception of user information by an IC card. When the login button 63 is pressed, the MFP 100 acquires authentication information inputted in the input section 62. In the present embodiment, authentication information is a combination of a user ID identifying a user and a password. When the IC card button 64 is pressed, the MFP 100 temporarily enables communication by the IC card reader 37 and acquires authentication information by using the IC card reader 37.

In response to acquiring authentication information, the MFP 100 transmits the authentication information to the authentication server 300 and requests user authentication. Then, the MFP 100 receives an authentication result from the authentication server 300. In response to receiving authentication success, the MFP 100 determines that login succeeds and permits use of the MFP 100 itself based on authority given to the login user. On the other hand, when authentication success is not received, the MFP 100 determines that login fails and does not permit use of the MFP 100 itself.

Figure 2B:
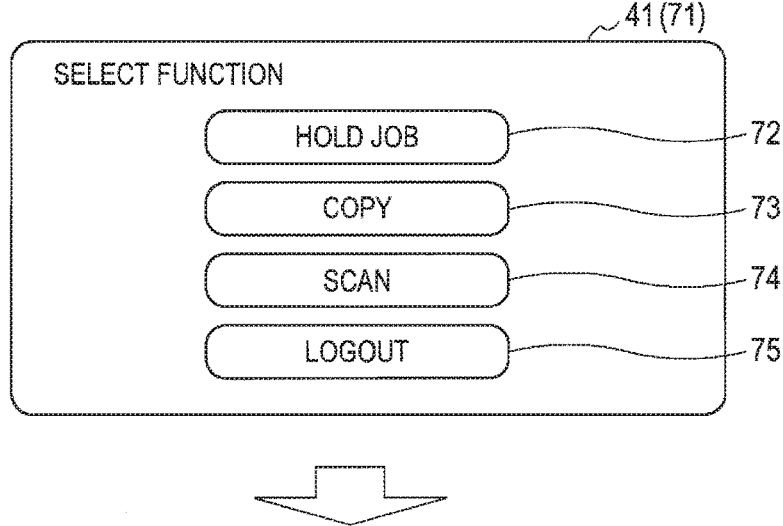

After login succeeds, the MFP 100 displays, on the touch panel 41, a function selection screen 71 for selecting a function to be used, as shown in FIG. 2B. The function selection screen 71 includes a hold job button 72 for receiving selection of printing "hold job", a copy button 73 for receiving selection of "copy" that is a function of reading an original document by using the reader 20 and printing a read image by using the printer 10, a scan button 74 for receiving selection of "scan" that is a function of reading an original document by using the reader 20 and saving a read image in a particular storage location, and a logout button 75 for receiving selection of "logout".

Figure 2C:
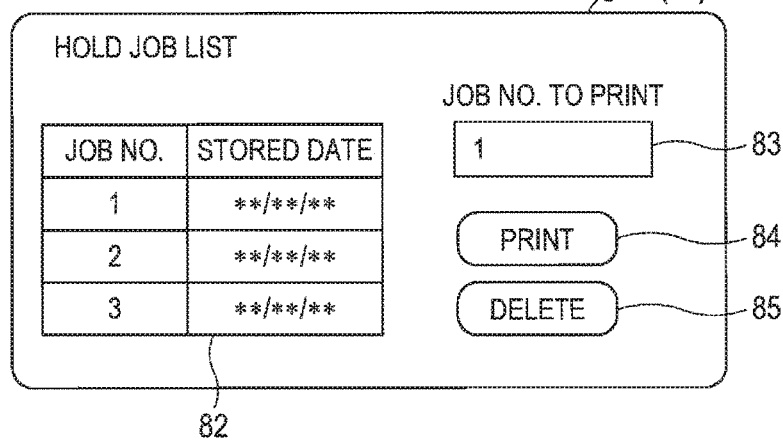

When the hold job button 72 is pressed in the function selection screen 71, the MFP 100 displays, on the touch panel 41, a hold job list screen 81 for selecting a hold job to be printed, as shown in FIG. 2C. The hold job list screen 81 includes a list display section 82 that displays, in a list format, hold jobs associated with a login user out of hold jobs stored in the RAM 33, a number section 83 for receiving a job number (registration number) of hold jobs, a print button 84, and a delete button 85.

When the print button 84 is pressed, the MFP 100 reads out the hold job of a job number that is inputted in the number section 83, and controls the printer 10 to perform printing based on the hold job. When the delete button 85 is pressed, the MFP 100 deletes, from the RAM 33, the hold job of a job number that is inputted in the number section 83.

A hold job remains to be stored in the MFP 100 until a user inputs a print instruction or a delete instruction. Hence, as a period of storing a job becomes longer, confidentiality deteriorates. Thus, the MFP 100 has a storage time that is a period in which a hold job can be stored and has an automatic delete function of, when a storage time elapses after a hold job is stored, deleting the hold job automatically.

[First Embodiment]

Figure 3:
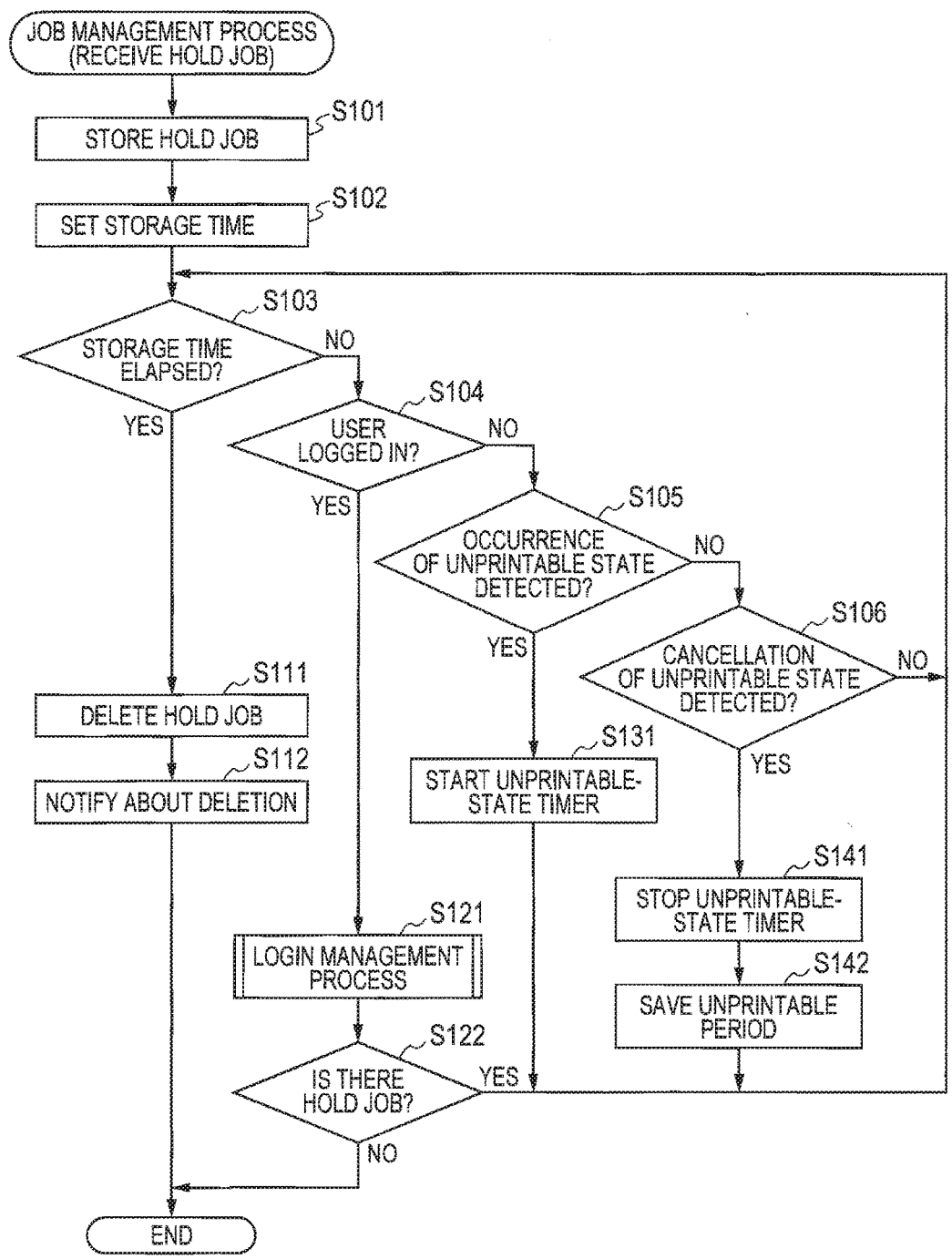
FIG. 3 is a flowchart showing the steps of a job management process of the MFP according to a first embodiment.

Next, the procedure of a job management process of the MFP 100 for realizing printing of the above-described hold job including an automatic delete function will be described while referring to the flowchart of FIG. 3. The job management process is a process of managing individual hold jobs, and is executed by the CPU 31 in response to reception of a hold job through the network interface 36. That is, if there is a plurality of received hold jobs, the job management process is executed for each hold job. Note that, when a print job other than a hold job is received, the job management process is not executed, and the printer 10 performs printing based on the print job.

In the job management process, the MFP 100 first stores the received hold job in the RAM 33 (S101). As described above, the MFP 100 stores the hold job in association with user information. Step S101 is an example of a storing process.

After S101, the MFP 100 sets a storage time of a target hold job that is the received and stored hold job (S102). Specifically, the MFP 100 sets, as the storage time, a length of a time period in which storage is permitted or a time point until which storage is permitted. In a case where the length of a period in which storage is permitted is set as the storage time, the MFP 100 starts time measurement by a storage timer that measures a period in which the hold job remains stored. Note that the storage time may be a constant value or may be a variable that differs depending on the authority of a user or the type of a job. Here, a job having a higher importance is easily affected by deterioration of confidentiality when the job is stored for a long period. Thus, for example, if the storage time is a variable, the storage time of a job having a higher importance is set to a shorter period than a job having a lower importance. Step S102 is an example of a setting process.

After S102, the MFP 100 determines whether the storage time set to the target hold job has elapsed (S103). The elapse of the storage time corresponds to the fact that the value of the storage timer exceeds the length of the storage time in a case where the storage time is a length of a time period for which storage is permitted, for example. Or, in a case where the storage time is a time point until which storage is permitted, the current time is acquired. In this case, the elapse of the storage time corresponds to the fact that the current time passes the set time.

If the storage time has elapsed (S103: YES), the MFP 100 deletes the target hold job form the RAM 33 (S111). Step S111 is an example of a deletion process. And, as necessary, the MFP 100 notifies the user of the hold job that the hold job is deleted (S112). In S112, for example, the MFP 100 transmits a signal that the hold job is deleted, to the external apparatus of the transmission source of the target hold job. The external apparatus having received the signal displays a message that the hold job is automatically deleted by the MFP 100, for example. After S112, the job management process ends.

On the other hand, if the storage time has not elapsed (S103: NO), the MFP 100 determines whether the user of the target hold job logs in to the MFP 100 (S104). If the user of the target hold job logs in to the MFP 100 (S104: YES), the MFP 100 executes a login management process that is a process of managing the target hold job during login (S121). The login management process of S121 will be described later.

If the user of the target hold job is not logged in to the MFP 100 (S104: NO), the MFP 100 determines whether, for the target hold job, the state has changed from a printable period to an unprintable period, that is, whether occurrence of an unprintable state is detected (S105). For example, the unprintable period includes a period in which an error occurs in the printer 10, and a period in which the printer 10 prints a job of another user. For example, errors of the printer 10 include a paper jam, a cover open, no printing paper, and no developer (ink, toner, and so on).

If occurrence of an unprintable state is detected (S105: YES), the MFP 100 start time measurement by an unprintable-state timer that measures a length of an unprintable period (S131). If no occurrence of an unprintable state is detected (S105: NO), the MFP 100 determines whether, for the target hold job, the state has changed from an unprintable period to a printable period, that is, whether cancellation of an unprintable state is detected (S106). If cancellation of an unprintable state is detected (S106: YES), the MFP 100 stops time measurement of the unprintable-state timer (S141) and stores, in the RAM 33, the length of the unprintable period measured by the unprintable-state timer (S142). In a case where there is a plurality of unprintable periods, the plurality of unprintable periods is added up.

If no cancellation of an unprintable state is detected (S106: NO), the MFP 100 moves to S103 and repeats each determination of elapse of the storage time, existence of login of the user of the hold job, and detection of occurrence or cancellation of an unprintable state. Also, after S131 or S142, the MFP 100 moves to S103 and repeats each determination of elapse of the storage time, existence of login of the user of the hold job, and detection of occurrence or cancellation of an unprintable state.

Figure 4:
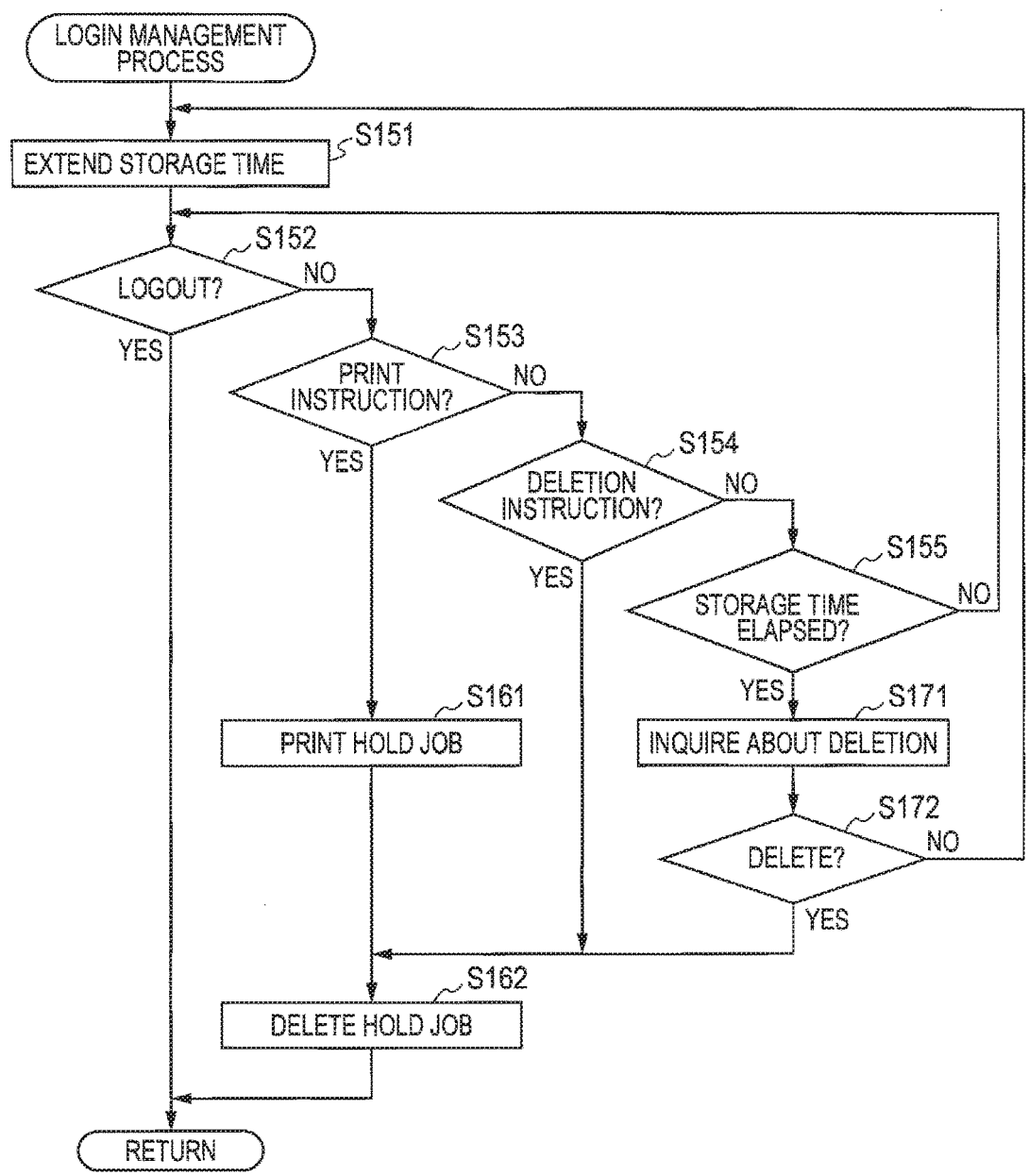
FIG. 4 is a flowchart showing the steps of a login management process of the MFP according to the first embodiment.

Here, the login management process of S121 will be described while referring to the flowchart of FIG. 4. In the login management process, the MFP 100 first extends the storage time set to the target hold job (S151).

The length to extend is a length that is obtained by adding a particular extension period to a value set depending on the length of the unprintable period. The length of the unprintable period is the length of the unprintable period stored in the RAM 33 in S142 or, if still unprintable at the time point of S151, the unprintable period is the measuring time of the unprintable-state timer at the time point of S151. The value set depending on the length of the unprintable period may be the unprintable period itself, or a value set depending on whether the unprintable period is larger than a threshold value, for example, or a value assigned depending on the length of the unprintable period. Note that the particular extension period may be a constant value or may be a variable that differs depending on the authority of a user or the type of a job, in a similar manner to the storage time. Here, a job having a higher importance is easily affected by deterioration of confidentiality when the job is stored for a long period. Thus, for example, if the extension period is a variable, the extension period of a job having a higher importance may be set to a shorter period than a job having a lower importance. Step S151 is an example of an extending process.

After S151, the MFP 100 determines whether the user has logged out (S152). The logout is performed when the logout button 75 of the function selection screen 71 is pressed, and is automatically performed when no operation period becomes longer than a particular period, for example. Further, the logout may be automatically performed when a hold job of a login user disappears. When the user has logged out (S152: YES), the MFP 100 ends the login management process.

When the user has not logged out (S152: NO), the MFP 100 determines whether a print instruction has been received for the target hold job (S153). The print instruction is received by a press of the print button 84 in the hold job list screen 81. When a print instruction has been received (S153: YES), the MFP 100 controls the printer 10 to perform printing based on the target hold job (S161). Step S161 is an example of a hold printing process. After printing is completed, the MFP 100 deletes the target hold job from the RAM 33 (S162). After S162, the login management process ends.

When no print instruction has been received (S153: NO), the MFP 100 determines whether a deletion instruction has been received for the target hold job (S154). The deletion instruction is received by a press of the delete button 85 in the hold job list screen 81. When a deletion instruction has been received (S154: YES), the MFP 100 deletes the target hold job from the RAM 33 (S162). After S162, the login management process ends.

When no deletion instruction has been received (S154: NO), the MFP 100 determines whether the storage time set to the target hold job has elapsed (S155). The storage time for which determination is made in S155 is the storage time extended in S151. When the storage time has elapsed (S155: YES), the MFP 100 inquires the user about whether to delete the target hold job (S171). For example, the MFP 100 displays, on the touch panel 41, a message inquiring about whether to delete the target hold job, and receives an instruction of whether to delete the target hold job.

After S171, the MFP 100 determines whether a deletion instruction has been received (S172). When an instruction to delete has been received (S172: YES), the MFP 100 deletes the target hold job from the RAM 33 (S162). Step S162 executed via S172 is an example of a deletion process. After S162, the login management process ends. When an instruction not to delete has been received (S172: NO), the MFP 100 moves to S151, and further extends the storage time.

When the storage time has not elapsed (S155: NO), the MFP 100 moves to S152 and repeats each determination of existence of logout, existence of a print instruction, existence of a deletion instruction, and elapse of the storage time.

Returning to FIG. 3, after the login management process in S121, the MFP 100 determines whether the target hold job is still stored in the RAM 33 (S122). If the target hold job is not deleted during the login management process and the target hold job is stored in the RAM 33 (S122: YES), the MFP 100 moves to S103 and repeats each determination of elapse of the storage time, existence of login of the user of the hold job, and the unprintable period. On the other hand, if the target hold job is deleted during the login management process and the target hold job is not stored in the RAM 33 (S122: NO), the MFP 100 ends the job management process.

As described above, in the first embodiment, because the storage time is extended by login of the user of the target hold job, the login operation is an example of a particular operation. The IC card reader 37 and the touch panel 41 that receive login information are an example of the input device. Further, printing of the hold job is performed in response to a press of the print button 84 during login as a print instruction. Hence, the touch panel 41 is an example of the input device.

In the first embodiment, when the received hold job is stored, a storage time is set to the hold job. After elapse of the storage time, the hold job is deleted, and hence it is avoided that the hold job remains stored for a long period. As a result of that, confidentiality of the hold job is kept. Further, when the user of received hold job logs in, the storage time of the hold job is extended. This reduces a possibility that the hold job is deleted during login, and reduces a possibility that the hold job is deleted in a state where the user has intention to use the MFP 100.

Note that step S104 in the job management process does not deal with login of users other than the user of the target hold job. That is, even when a user other than the user of the target hold job logs in, the login management process of S121 is not executed. That is, a certain user logs in to the MFP 100, the storage time of the hold job of that user is extended, whereas the storage time of a hold job of another user is not extended. Hence, login of that user does not affect confidentiality of hold job of another user.

[Second Embodiment]

Figure 5:
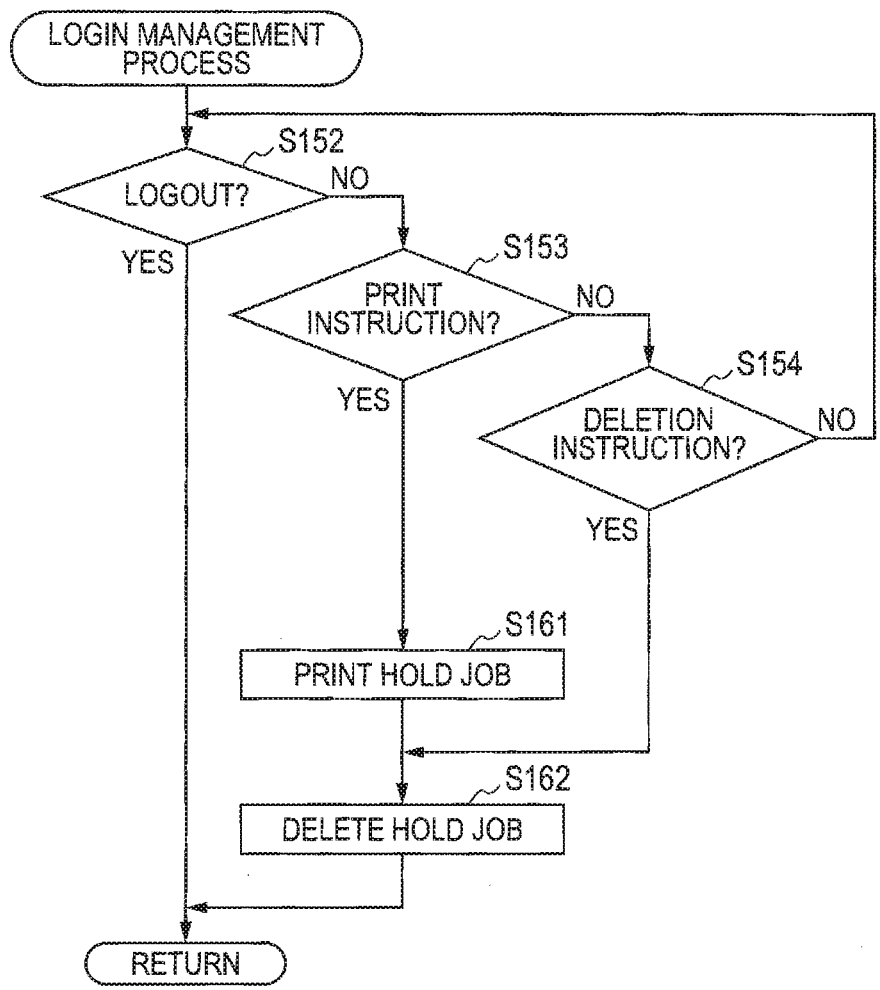
FIG. 5 is a flowchart showing the steps of a login management process of the MFP according to a second embodiment.

Next, the procedure of a login management process of the MFP 100 realizing the printing procedure of a hold job according to a second embodiment will be described while referring to the flowchart of FIG. 5. In the second embodiment, during login (while a user is logged in), elapse of a storage time is not determined, thereby substantially deferring deletion of the target hold job. This is different from the first embodiment in which a storage time is extended in response to login. Note that the same processes as the first embodiment are designated by the same reference numerals to avoid duplicating description.

In the login management process of the second embodiment, the MFP 100 first does not change the storage time and determines whether the user has logged out (S152). If the user has logged out (S152: YES), the MFP 100 ends the login management process.

If the user has not logged out (S152: NO), the MFP 100 determines whether a print instruction for the target hold job has been received (S153). If a print instruction has been received (S153: YES), the MFP 100 controls the printer 10 to perform printing based on the target hold job (S161). Then, after printing is completed, the target hold job is deleted (S162). After S162, the login management process ends.

If no print instruction has been received (S153: NO), the MFP 100 determines whether a deletion instruction for the target hold job has been received (S154). If a deletion instruction has been received (S154: YES), the MFP 100 deletes the target hold job (S162). After S162, the login management process ends. If no deletion instruction has been received (S154: NO), the MFP 100 moves to S152 and repeats each determination of existence of logout, existence of a print instruction, and existence of a deletion instruction.

In the second embodiment, the MFP 100 does not determine elapse of the storage time during login. Thus, even if the measuring time elapses the storage time, the target hold job is not deleted. Hence, even a target hold job having elapsed the storage time can be printed. That is, the entirety of the login management process is an example of a deferring process. Note that, when logout is performed after elapse of the storage time in a state where the target hold job is not printed, the process returns to the job management process while the target hold job remains stored. However, after the process returns to the job management process, it is determined in S103 that the storage time has elapsed, and hence in S111 the target hold job is deleted. That is, regarding the target hold job of which the storage time has elapsed, deletion is deferred until it is determined that an operation for login is completed, and the target hold job is deleted immediately after logout.

Because the job management process of the second embodiment is the same as that of the first embodiment, when the received hold job is stored, a storage time is set to the hold job. And, after elapse of the storage time, the hold job is deleted, and hence confidentiality of the hold job is kept. Further, when the user of the received hold job logs in, deletion of the hold job is deferred until logout. This reduces a possibility that the hold job is deleted during login, and reduces a possibility that the hold job is deleted in a state where the user has intention to use the MFP 100.

Note that, in the second embodiment, the storage time is not extended. Hence, determinations of unprintable state in S105 and S106 in the job management process are unnecessary, and the process may be move to S103 when the user is not logged in (S104: NO). Alternatively, determinations of unprintable state in S105 and S106 in the job management process and processes corresponding to those determinations may exist. And, in the login management process of the second embodiment, the storage time may be extended by the length of unprintable period stored in the job management process, in response to login.

[Third Embodiment]

Figure 6:
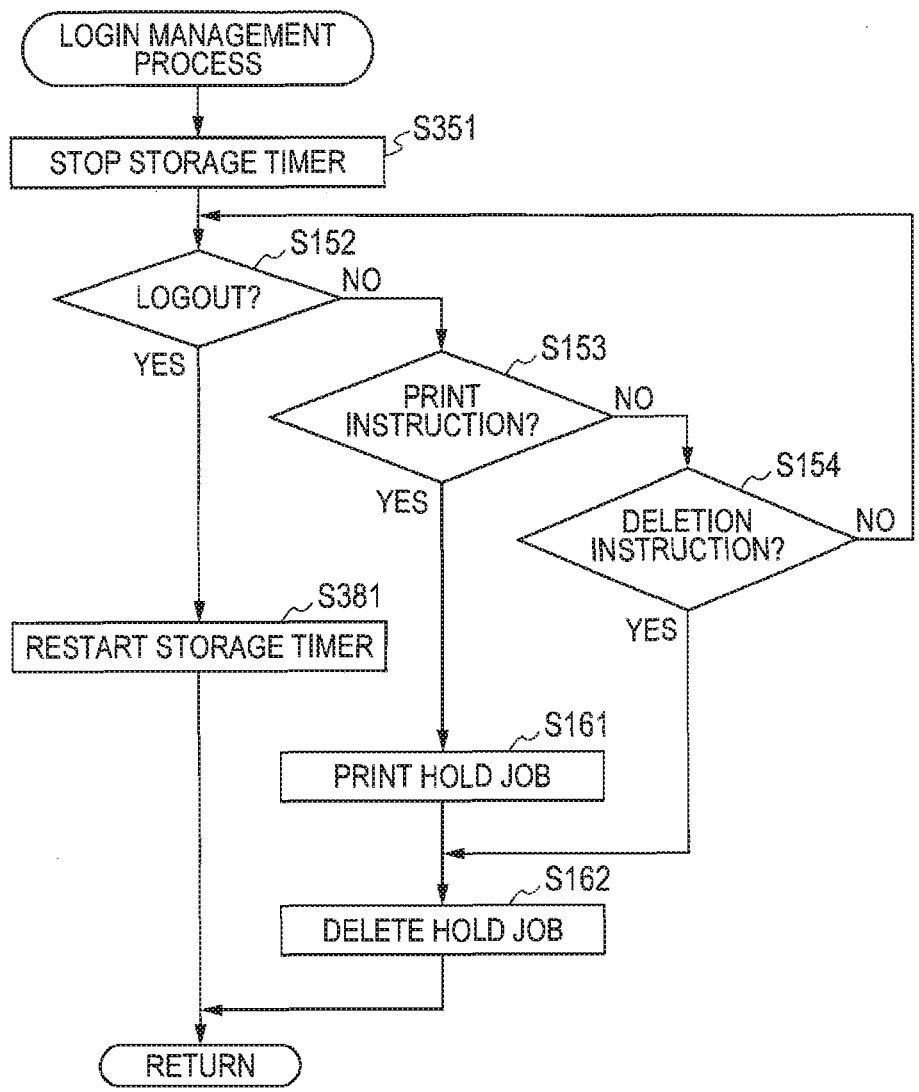
FIG. 6 is a flowchart showing the steps of a login management process of the MFP according to a third embodiment.

Next, the procedure of a login management process of the MFP 100 realizing the printing procedure of a hold job according to a third embodiment will be described while referring to the flowchart of FIG. 6. In the third embodiment, time measurement of the storage timer is stopped during login. This is different from the second embodiment in which time measurement of the storage timer is continued during login. Note that the same processes as the first and second embodiments are designated by the same reference numerals to avoid duplicating description.

In the login management process of the third embodiment, the MFP 100 first stops time measurement of the storage timer of the target hold job (S351). By stopping time measurement of the storage timer, the storage time does not elapse (does not run out) during login, and hence the MFP 100 does not delete the target hold job. Step S351 is an example of a deferring process. Note that, in the third embodiment, time measurement of the storage timer is stopped. Thus, the storage time set in S102 of the job management process is not a time point until which storage is permitted but the length of a time period during which storage is permitted.

After S351, the MFP 100 determines whether the user has logged out (S152). If the user has logged out (S152: YES), the MFP 100 restarts time measurement of the storage timer that is stopped in S351 (S381). After S381, the login management process ends.

If the user has not logged out (S152: NO), the MFP 100 determines whether a print instruction for the target hold job has been received (S153). The process of S153 and thereafter are the same as those in the second embodiment. In the third embodiment, because time measurement of the storage timer is stopped, the value of the storage timer does not pass the storage time. Hence, determination of elapse of the storage time is omitted. However, elapse of the storage time may be determined.

In the third embodiment, when the user of the received hold job logs in, time measurement of the storage timer of the hold job is stopped until the user logs out. Thus, the storage time does not elapse during login, and deletion of the hold job is substantially deferred until it is determined that an operation to the operation panel 40 such as logout is completed. Further, the storage time is substantially extended by the period during which the user is logged in. This reduces a possibility that the hold job is deleted in a state where the user has intention to use the MFP 100.

[Fourth Embodiment]

Figure 7:
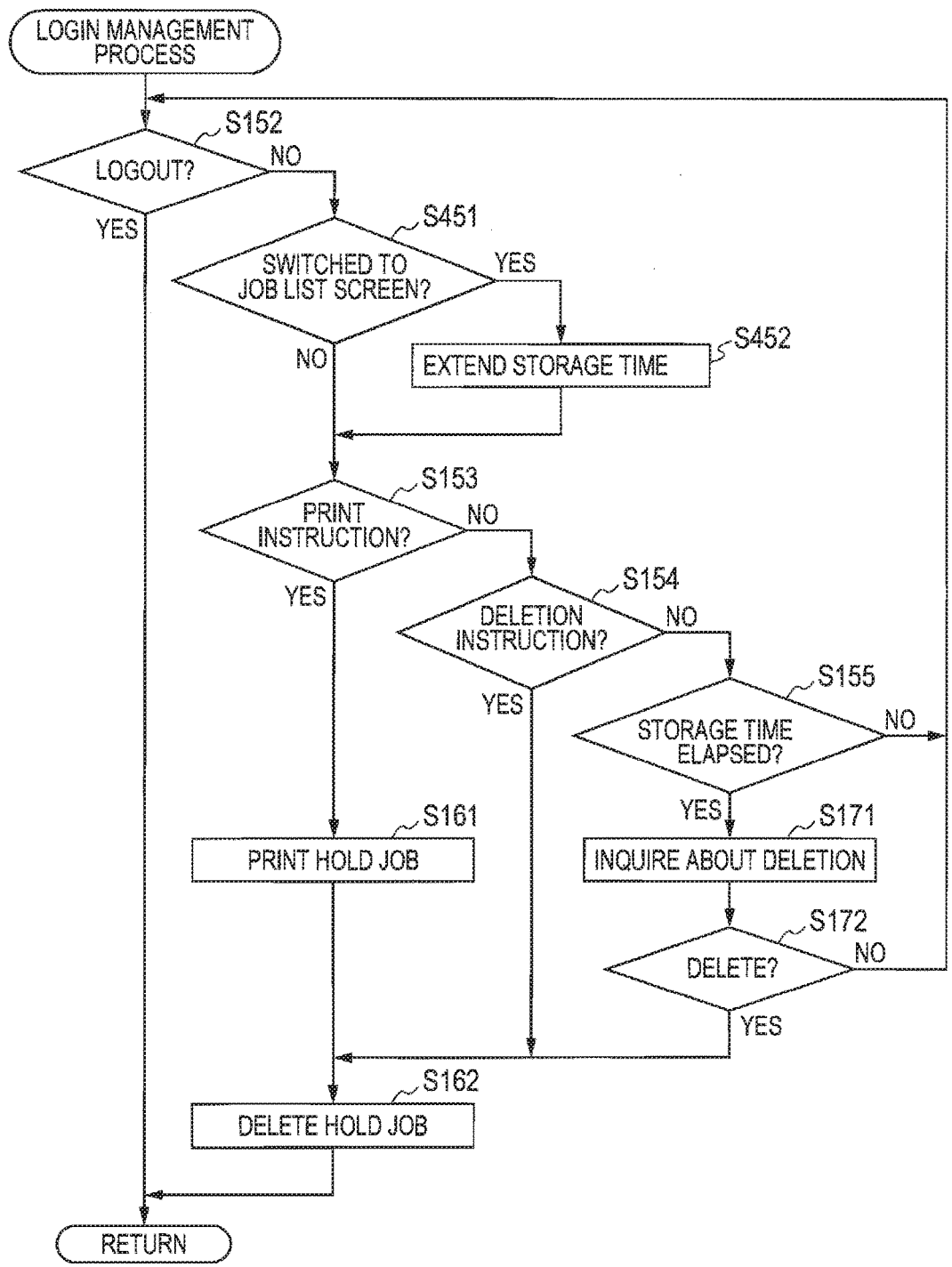
FIG. 7 is a flowchart showing the steps of a login management process of the MFP according to a fourth embodiment.

Next, the procedure of a login management process of the MFP 100 realizing the printing procedure of a hold job according to a fourth embodiment will be described while referring to the flowchart of FIG. 7. In the fourth embodiment, the storage time of the target hold job is extended on condition that the hold job list screen 81 is displayed on the touch panel 41. This is different from the first embodiment in which the storage time of the target hold job is extended in response to login. Note that the same processes as the first embodiment are designated by the same reference numerals to avoid duplicating description.

In the login management process of the fourth embodiment, first, the MFP 100 determines whether the user has logged out (S152) without changing the storage time. If the user has logged out (S152: YES), the MFP 100 ends the login management process.

If the user has not logged out (S152: NO), the MFP 100 determines whether the display screen of the touch panel 41 is switched to the hold job list screen 81 (S451). If the display screen of the touch panel 41 is switched to the hold job list screen 81 (S451: YES), the MFP 100 extends the storage time of the target hold job (S452). The period to extend is set in a similar manner to S101 in the login management process of the first embodiment. Step S452 is an example of an extending process. Note that the hold jobs of the login user stored in the RAM 33 is displayed in the list display section 82 of the hold job list screen 81. That is, each storage time of all the hold job displayed in the list display section 82 is extended.

After S452, or if the display screen of the touch panel 41 is not switched to the hold job list screen 81 (S451: NO), the MFP 100 determines whether a print instruction for the target hold job has been received (S153). The processes in S153 and thereafter are the same as those in the first embodiment. Note that, in the fourth embodiment, if the storage time has not elapsed (S155: NO), the MFP 100 moves to S152 and repeats each determination of existence of logout, existence of a print instruction, existence of a deletion instruction, and elapse of the storage time as well as determination of whether the hold job list screen 81 is switched.

As described above, in the fourth embodiment, the storage time is extended due to display of the hold job list screen 81 during login. Thus, an operation of pressing the hold job button 72 in the function selection screen 71 is an example of a particular operation. And, the touch panel 41 that displays the hold job button 72 is an example of the input device. Further, the hold job is printed in response to a print instruction that is a press of the print button 84 performed during login. Hence, the touch panel 41 is an example of the input device.

In the fourth embodiment, too, the job management process is the same as that of the first embodiment. Thus, when the received job is stored, a storage time is set to the hold job. And, after the storage time has elapsed, the hold job is deleted, thereby keeping confidentiality of the hold job. Further, the storage time of the received hold job is extended due to display of the hold job list screen 81. This reduces a possibility that the hold job is deleted in a state where the user has intention to use the MFP 100.

Note that, in the login management process of the fourth embodiment, in a similar manner to the first embodiment, the storage time is extended due to display of the hold job list screen 81. As in the second and third embodiments, however, deletion of the target hold job may be deferred until the display of the touch panel 41 is switched to a screen other than the hold job list screen 81 after being switched to the hold job list screen 81. That is, deletion of the target hold job may be deferred while the hold job list screen 81 is being displayed.

[Fifth Embodiment]

Figure 8:
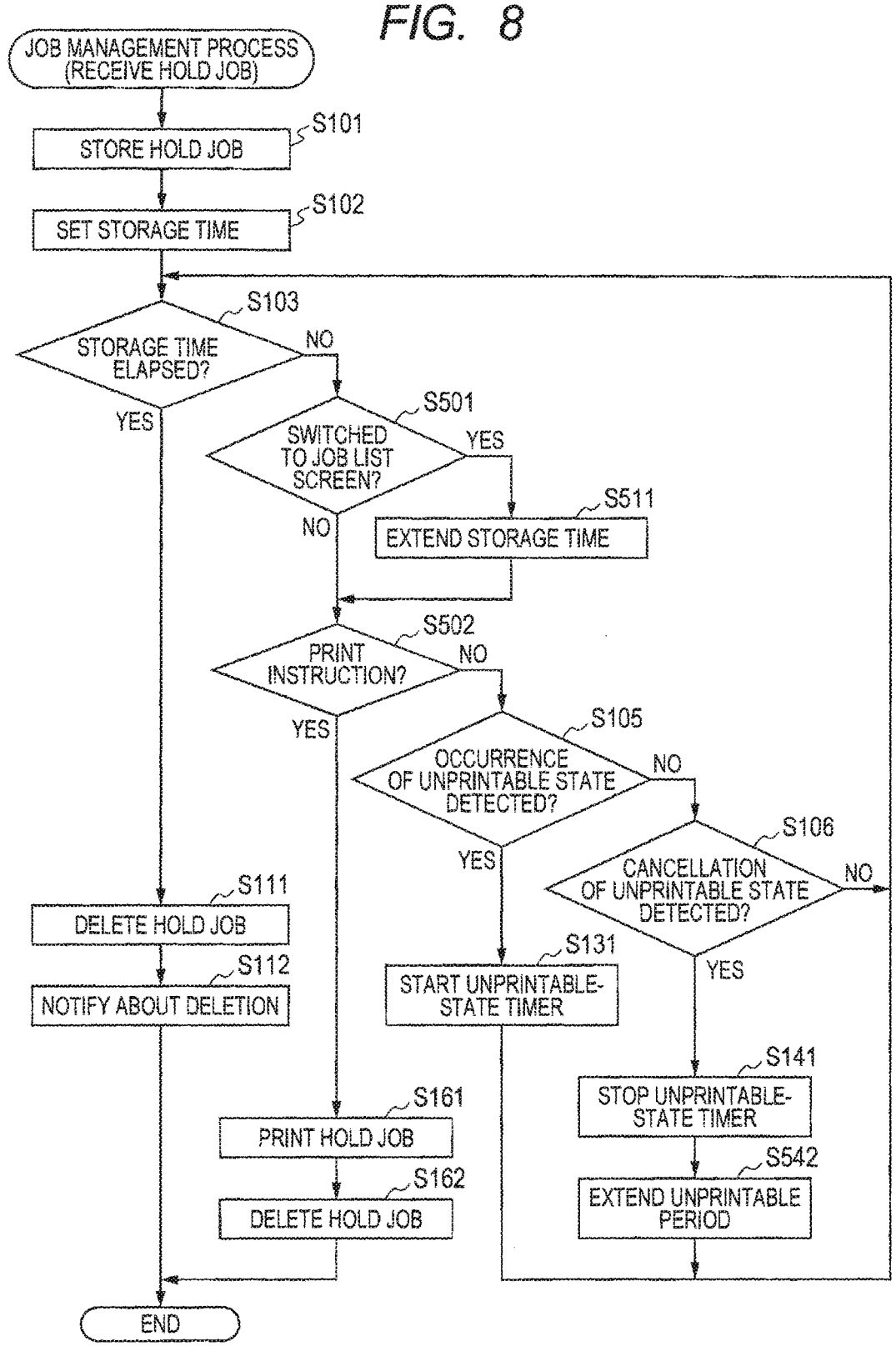
FIG. 8 is a flowchart showing the steps of a job management process of the MFP according to a fifth embodiment.

Next, the procedure of a job management process of the MFP 100 for realizing printing procedure of the hold job according to a fifth embodiment will be described while referring to the flowchart of FIG. 8. In the fifth embodiment, in a similar manner to the fourth embodiment, the storage time is extended on condition that the display of the touch panel 41 is switched to the hold job list screen 81. However, in the fifth embodiment, login is not needed to execute a hold job. Hence, the login management process is not executed, and the storage time is extended by the job management process. Note that the same processes as the first embodiment are designated by the same reference numerals to avoid duplicating description.

In the job management process of the fifth embodiment, the MFP 100 first stores the received hold job (S101), and sets the storage time of the target hold job (S102). After S102, the MFP 100 determines whether the storage time of the target hold job has elapsed (S103). If the storage time has elapsed (S103: YES), the MFP 100 deletes the target hold job (S111). The processes in S111 and thereafter are the same as those in the first embodiment.

If the storage time has not elapsed (S103: NO), the MFP 100 determines whether the display is switched to the hold job list screen 81 (S501). If the display is switched to the hold job list screen 81 (S501: YES), the MFP 100 extends the storage time of the target hold job (S511). In the fifth embodiment, because login is not needed, the MFP 100 displays the function selection screen 71 from the beginning. And, because the user who uses the MFP 100 is not identified, the MFP 100 displays, on the list display section 82, all the hold jobs stored in the RAM 33. That is, when the hold job list screen 81 is displayed, each storage time of all the hold jobs stored in the RAM 33 is extended. Step S511 is an example of an extending process.

After S511, or if the display is not switched to the hold job list screen 81 (S501: NO), the MFP 100 determines whether a print instruction for the target hold job has been received (S502). In the fifth embodiment, after the print button 84 is pressed in the hold job list screen 81, the MFP 100 requests input of authentication information corresponding to the selected hold job. If the correct authentication information is inputted, the MFP 100 determines that a print instruction has been received. If the correct authentication information is not inputted, the MFP 100 does not determine that a print instruction has been received.

Note that, in the fifth embodiment, authentication information corresponding to the hold job is not limited to information needed for user authentication. For example, authentication information corresponding to the hold job may be a password assigned to each job. Alternatively, if authentication information is not assigned, the MFP 100 may receive only a press of the print button 84 as a print instruction, without requesting input of authentication information.

If a print instruction has been received (S502: YES), the MFP 100 controls the printer 10 to perform printing based on the target hold job (S161). After printing is completed, the target hold job is deleted from the RAM 33 (S162). After S162, the login management process ends.

If no print instruction has been received (S502: NO), the MFP 100 determines whether occurrence of an unprintable state is detected (S105). If occurrence of an unprintable state is detected (S105: YES), the MFP 100 starts time measurement by an unprintable-state timer (S131). If no occurrence of an unprintable state is detected (S105: NO), the MFP 100 determines whether cancellation of an unprintable state is detected (S106). If cancellation of an unprintable state is detected (S106: YES), the MFP 100 stops time measurement of the unprintable-state timer (S141). Further, the MFP 100 extends the storage time of the target hold job by the length of the period measured by the unprintable-state timer (S542).

After S131 or S542, the MFP 100 moves to S103 and repeats each determination of elapse of the storage time, display of the hold job list screen 81, existence of a print instruction, and detection of occurrence or cancellation of an unprintable state.

As described above, in the fifth embodiment, the storage time is extended due to display of the hold job list screen 81. Thus, an operation of pressing the hold job button 72 in the function selection screen 71 is an example of a particular operation. And, the touch panel 41 is an example of the input device. Further, a hold job is executed by a press of the print button 84 and input of correct authentication information after selection of the hold job. Hence, the touch panel 41 is an example of the input device. Note that, in a case where authentication information is inputted by an IC card, the IC card reader 37 is an example of the input device.

In the fifth embodiment, too, when the received job is stored, a storage time is set to the hold job. After the storage time has elapsed, the hold job is deleted so that confidentiality of the hold job is kept. Further, the storage time of the received hold job is extended due to display of the hold job list screen 81. This reduces a possibility that the hold job is deleted in a state where the user has intention to use the MFP 100.

Note that, in the fifth embodiment, the user cannot be identified when the hold job list screen 81 is displayed. Thus, each storage time of all the hold jobs stored in the RAM 33 is extended. In this regard, in the first embodiment, because the user can be identified by login, the storage time of the hold job of the login user is extended whereas the storage time of the hold job of another user is not extended. That is, the storage time of hold jobs can be extended individually.

Further, in the job management process of the fifth embodiment, the storage time is extended due to display of the hold job list screen 81, in a similar manner to the first and fourth embodiments. As in the second and third embodiments, however, deletion of the target hold job may be deferred until the display of the touch panel 41 is switched to a screen other than the hold job list screen 81 after being switched to the hold job list screen 81. That is, deletion of the target hold job may be deferred while the hold job list screen 81 is being displayed.

[Sixth Embodiment]

Figure 9:
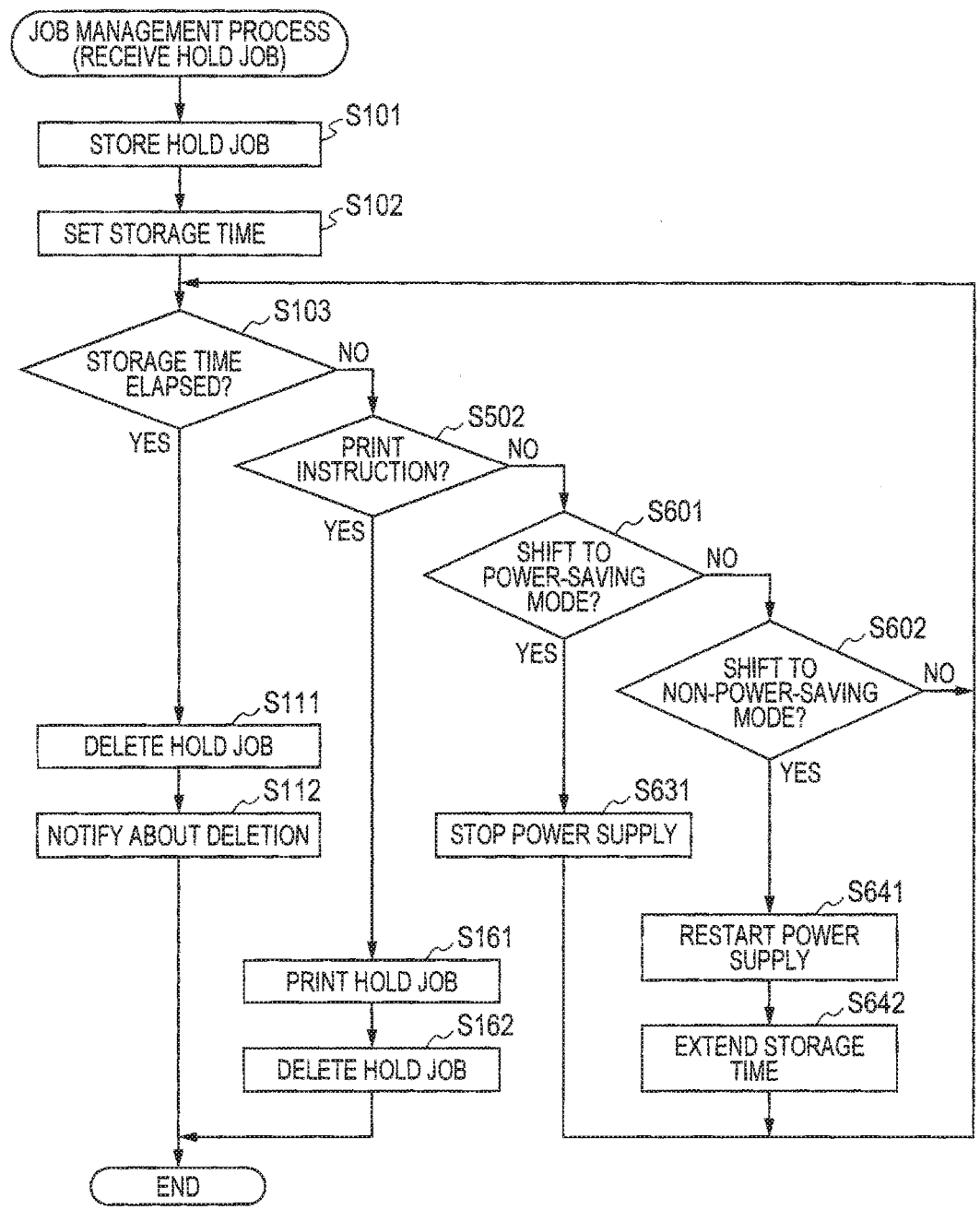
FIG. 9 is a flowchart showing the steps of a job management process of the MFP according to a sixth embodiment.

Next, the procedure of a job management process of the MFP 100 for realizing printing procedure of the hold job according to a sixth embodiment will be described while referring to the flowchart of FIG. 9. In the sixth embodiment, in a similar manner to the fifth embodiment, login is not needed to execute a hold job. Further, in contrast to the fifth embodiment, the storage time is extended on condition that the operational mode of the MFP 100 is switched from the power-saving mode to the non-power-saving mode. Note that the same processes as the first and fifth embodiments are designated by the same reference numerals to avoid duplicating description.

In the job management process of the sixth embodiment, the MFP 100 first stores the received hold job (S101), and sets a storage time of the target hold job (S102). After S102, the MFP 100 determines whether the storage time of the target hold job has elapsed (S103). If the storage time has elapsed (S103: YES), the MFP 100 deletes the hold job (S111). The processes in S111 and thereafter are the same as the first embodiment.

If the storage time has not elapsed (S103: NO), the MFP 100 determines whether a print instruction for the target hold job has been received (S502). If a print instruction has been received (S502: YES), the MFP 100 controls the printer 10 to perform printing based on the target hold job (S161). The processes in S161 and thereafter are the same as those in the fifth embodiment.

If no print instruction has been received (S502: NO), the MFP 100 determines whether the MFP 100 is operating in the non-power-saving mode and a condition of shifting to the power-saving mode is satisfied (S601). The condition of shifting to the power-saving mode includes a fact that the power saving button 42 of the operation panel 40 is pressed, as well as, for example, a fact that there is no operation to the operation panel 40 for a certain period and no job has been received from the external apparatus for a certain period or longer, and a fact that an instruction of shifting to the power-saving mode has been inputted from an external apparatus such as the PC 200.

If the condition of shifting to the power-saving mode is satisfied (S601: YES), the MFP 100 stops power supply to particular elements (S631) and shifts to the power-saving mode. Note that, even when operating in the power-saving mode, the MFP 100 continues power supply to the controller 30. Hence, the job management process does not end and, even in the power-saving mode, when the storage time has elapsed, the MFP 100 deletes the target hold job from the RAM 33.

If the condition of shifting to the power-saving mode is not satisfied (S601: NO), the MFP 100 determines whether the MFP 100 is operating in the power-saving mode and a condition of shifting to the non-power-saving mode is satisfied (S602). If the condition of shifting to the non-power-saving mode is satisfied (S602: YES), the MFP 100 restarts power supply to the elements for which power supply is stopped in S631 (S641), and shifts to the non-power-saving mode.

After S641, the MFP 100 extends the storage time of the target hold job (S642). The period to add may be the same as the period in S101 of the login management process of the first embodiment, or may be longer than the period in S101 in view of time and effort to input authentication information for perform printing. Further, because the user using the MFP 100 is not identified, when the operational mode is shifted to the non-power-saving mode, each storage time of all the hold jobs stored in the RAM 33 is extended. Step S642 is an example of an extending process.

If the condition of shifting to the non-power-saving mode is not satisfied (S602: NO), the MFP 100 moves to S103 and repeats each determination of elapse of the storage time, existence of login of the user of the hold job, and a shift to the power-saving mode or the non-power-saving mode. Also, after S631 or S642, the MFP 100 moves to S103 and repeats each determination of elapse of the storage time, existence of login of the user of the hold job, and a shift to the power-saving mode or the non-power-saving mode.

As described above, in the sixth embodiment, the storage time is extended due to the shift to the non-power-saving mode. Thus, an operation of pressing the power saving button 42 is an example of a particular operation. And, the power saving button 42 is an example of the input device.

In the sixth embodiment, too, when the received job is stored, a storage time is set to the hold job. After the storage time has elapsed, the hold job is deleted so that confidentiality of the hold job is kept. Further, when an operation to shift to the non-power-saving mode is received, the storage time of the received hold job is extended. This reduces a possibility that the hold job is deleted in a state where the user has intention to use the MFP 100.

Figure 10:
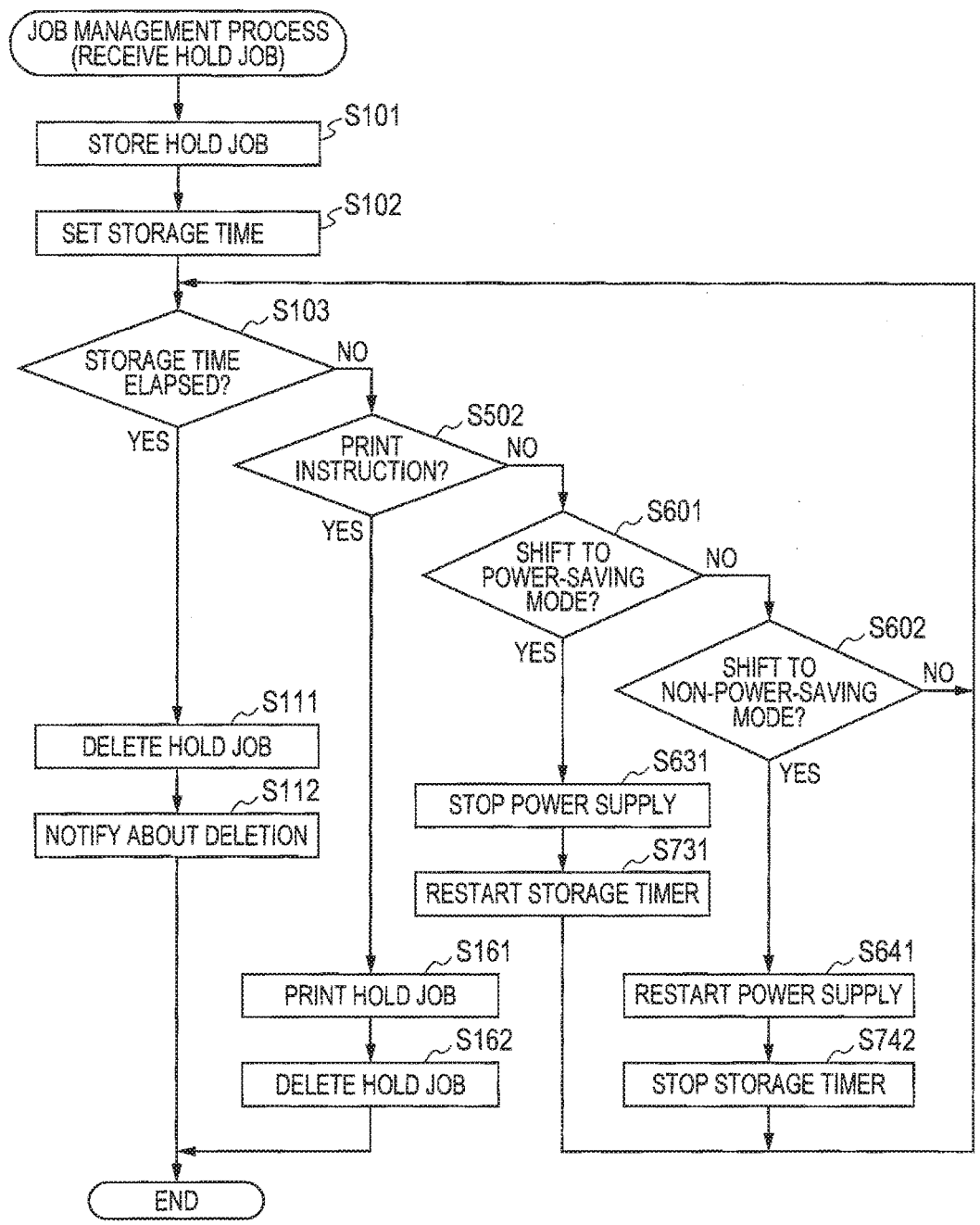
FIG. 10 is a flowchart showing the steps of a variation of the job management process of the MFP according to the sixth embodiment.

In the sixth embodiment, in response to receiving an operation to shift to the non-power-saving mode, the storage time of the target hold job is extended in a similar manner to the first embodiment. For example, however, as in the third embodiment, deletion of the target hold job may be deferred by stopping time measurement of the storage timer. In this case, as shown in FIG. 10, if the condition of shifting to the non-power-saving mode is satisfied (S602: YES), the MFP 100 shifts to the non-power-saving mode (S641) and further stops time measurement of the storage timer (S742). On the other hand, if the condition of shifting to the power-saving mode is satisfied (S601: YES), the MFP 100 shifts to the power-saving mode (S631) and further restarts time measurement of the storage timer (S731). With this configuration, when an operation of shifting to the non-power-saving mode is received, the MFP 100 defers deletion of the target hold job until the condition of shifting to the power-saving mode is satisfied.

As described in detail, when the received hold job is stored for a longer period than the storage time (in a case where the storage time is a time period) or when the received hold job is stored until a time point later than the storage time (in a case where the storage time is a time point), the MFP 100 automatically deletes the hold job. With this configuration, confidentiality of the hold job is secured. On the other hand, when the MFP 100 receives a particular operation by which it is assumed that the user has intention to use the MFP 100, such as login, a possibility increases that a print instruction for the hold job is received. Thus, when the particular operation is received, the MFP 100 performs at least one of extension of the storage time and deferral of deletion of the hold job. This reduces a possibility that the hold job is deleted in a state where the user has intention to use the MFP 100. As a result, usability is expected to increase. For example, a user can perform an operation for the hold job at ease.

While the disclosure has been described in detail with reference to the above aspects thereof, it would be apparent to those skilled in the art that various changes and modifications may be made therein without departing from the scope of the claims. For example, the printing apparatus may be a copier, a printer, or a facsimile apparatus, as well as a multifunction peripheral, as long as the printing apparatus has a print function.

In the above-described embodiments, power supply to the printer 10, the reader 20, and the touch panel 41 is restricted in the power-saving mode. However, the target to restrict power supply is not limited to these devices. For example, power supply to the network interface 36 and the wireless communication interface 37 may be restricted. In the power-saving mode, power supply to at least one element other than the controller 30 is restricted, and it is not necessary to restrict power supply to all of the printer 10, the reader 20, and the touch panel 41. Further, in a case where power supply to the touch panel 41 is not restricted in the power-saving mode, the MFP 100 may shift to the non-power-saving mode on condition that the touch panel 41 has been operated in the power-saving mode.

In the above-described embodiments, the authentication server 300 stores information needed for authentication of users, and the authentication server 300 performs user authentication. However, the MFP 100 may store information needed for authentication of users, and the MFP 100 itself may perform user authentication.

In the above-described embodiments, the RAM 33 of the MFP 100 stores hold jobs. However, the NVRAM 34 may store hold jobs. Alternatively, an external apparatus may store hold jobs. In this case, when a print condition of a hold job is satisfied, the MFP 100 may read out the hold job from the external apparatus and perform printing.

The processes disclosed in the above-described embodiments may be executed by a single CPU, a plurality of CPUs, hardware such as ASIC, or a combination thereof. Further, the processes disclosed in the above-described embodiments can be realized by various modes such as a method and a storage medium storing a program for executing the processes.

What is claimed is:
1. A printing apparatus comprising:
 a communicator configured to communicate with an external apparatus;
 an input device configured to receive an input operation;
 a printer;
 a processor; and
 a memory storing instructions, the instructions, when executed by the processor, causing the processor to perform:
  storing, in the memory, a print job received through the communicator;
  controlling the printer to print a hold job that is a print job stored in the memory, in response to receiving, through the input device, a print instruction for the hold job;
  setting a storage time, the storage time being one of a time period during which the hold job is stored and a time point until which the hold job is stored;
  when the hold job remains stored in the memory past the storage time, deleting the hold job from the memory; and
  in response to receiving an operation to log in to the printing apparatus through the input device, performing at least one of:
   extending the storage time of the hold job by a period that is obtained by adding a particular extension period to a value set depending on a length of an unprintable period, the unprintable period being a period in which the printer is unable to print the hold job while the hold job is stored in the memory; and
   deferring deletion of the hold job until a completion condition is satisfied, the completion condition being a condition indicating that an operation to the input device is completed.

2. The printing apparatus according to claim 1, wherein the memory further stores instructions, when executed by the processor, causing the processor to perform at least the deferring deletion of the hold job; and
 wherein the completion condition is a logout from the printing apparatus.

3. The printing apparatus according to claim 1, wherein the memory further stores instructions, when executed by the processor, causing the processor to:
 when extending the storage time of the hold job, extend a storage time of a hold job associated with a login user out of hold jobs stored in the memory, without extending a storage time of a hold job associated with a user other than the login user.

4. The printing apparatus according to claim 1, wherein the memory further stores instructions, when executed by the processor, causing the processor to:
 when deferring deletion of the hold job, defer deletion of a hold job associated with a login user out of hold jobs stored in the memory, without deferring deletion of a hold job associated with a user other than the login user.

5. The printing apparatus according to claim 1, wherein the memory further stores instructions, when executed by the processor, causing the processor to:
 calculate the unprintable period;
 perform at least the extending the storage time of the hold job; and
 add a period corresponding to the unprintable period to the storage time when extending the storage time of the hold job.

6. The printing apparatus according to claim 1, wherein the memory further stores instructions, when executed by the processor, causing the processor to:
 start a timer configured to measure the storage time;
 when measuring time of the timer exceeds the storage time corresponding to the hold job, delete the hold job from the memory;

perform at least the deferring deletion of the hold job; and
when deferring deletion of the hold job, stop the timer until the completion condition is satisfied.

7. The printing apparatus according to claim 1, wherein the memory further stores instructions, when executed by the processor, causing the processor to:
perform at least the deferring deletion of the hold job; and
when the storage time of the hold job elapses before the completion condition is satisfied, defer deletion of the hold job until the completion condition is satisfied.

8. The printing apparatus according to claim 1,
wherein the completion condition is a logout from the printing apparatus; and
wherein the memory further stores instructions, when executed by the processor, causing the processor to perform, during a login state:
determining whether the storage time has elapsed;
in response to elapse of the storage time, inquiring about whether to delete the hold job; and
in response to receiving an instruction to delete the hold job, deleting the hold job from the memory.

9. A printing apparatus comprising:
a communicator configured to communicate with an external apparatus;
an input device configured to receive an input operation;
a printer;
a processor; and
a memory storing instructions, the instructions, when executed by the processor, causing the processor to perform:
storing, in the memory, a print job received through the communicator;
controlling the printer to print a hold job that is a print job stored in the memory, in response to receiving, through the input device, a print instruction for the hold job;
setting a storage time, the storage time being one of a time period during which the hold job is stored and a time point until which the hold job is stored;
when the hold job remains stored in the memory past the storage time, deleting the hold job from the memory; and
in response to receiving an operation of shifting from a power-saving mode to a non-power-saving mode through the input device, performing at least one of:
extending the storage time of the hold job by a period that is obtained by adding a particular extension period to a value set depending on a length of an unprintable period, the unprintable period being a period in which the printer is unable to print the hold job while the hold job is stored in the memory; and
deferring deletion of the hold job until a completion condition is satisfied,
the power-saving mode being a mode of restricting power supply to at least one of elements configured to consume electric power, and the non-power-saving mode being a mode of not restricting power supply.

10. The printing apparatus according to claim 9, wherein the memory further stores instructions, when executed by the processor, causing the processor to perform at least the deferring deletion of the hold job; and
wherein the completion condition is a shift from the non-power-saving mode to the power-saving mode.

11. A printing apparatus comprising:
a communicator configured to communicate with an external apparatus;
an input device configured to receive an input operation;
a printer;
a processor;
a display; and
a memory storing instructions, the instructions, when executed by the processor, causing the processor to perform:
storing, in the memory, a print job received through the communicator;
controlling the printer to print a hold job that is a print job stored in the memory, in response to receiving, through the input device, a print instruction for the hold job;
setting a storage time, the storage time being one of a time period during which the hold job is stored and a time point until which the hold job is stored;
when the hold job remains stored in the memory past the storage time, deleting the hold job from the memory; and
in response to receiving, through the input device, an operation of displaying a selection screen on the display, performing at least one of:
extending the storage time of the hold job by a period that is obtained by adding a particular extension period to a value set depending on a length of an unprintable period, the unprintable period being a period in which the printer is unable to print the hold job while the hold job is stored in the memory; and
deferring deletion of the hold job until a completion condition is satisfied,
the selection screen being a screen allowing selection of a hold job to be printed, out of hold jobs stored in the memory.

12. The printing apparatus according to claim 11,
wherein the memory further stores instructions, when executed by the processor, causing the processor to, when extending the storage time of the hold job, add a period corresponding to the unprintable period to a storage time of a hold job associated with a login user out of hold jobs stored in the memory, without adding the period corresponding to the unprintable period to a storage time of a hold job associated with a user other than the login user.

13. The printing apparatus according to claim 11, wherein the memory further stores instructions, when executed by the processor, causing the processor to perform at least the deferring deletion of the hold job; and
wherein the completion condition is that the display is switched from the selection screen to a screen other than the selection screen.

* * * * *